United States Patent [19]

Dickenson

[11] 4,185,798
[45] Jan. 29, 1980

[54] THRUST REVERSER–CASCADE TWO DOOR PRE-EXIT

[75] Inventor: Robert Dickenson, Chula Vista, Calif.

[73] Assignee: Rohr Industries, Inc., Chula Vista, Calif.

[21] Appl. No.: 885,774

[22] Filed: Mar. 13, 1978

[51] Int. Cl.² ............................................. B64C 15/04
[52] U.S. Cl. .......................... 244/110 B; 239/265.29; 239/265.31; 60/226 A
[58] Field of Search ........................ 244/23 D, 110 B; 239/265.33, 265.31, 265.29, 265.27, 265.25, 265.37; 60/226 A, 230

[56] References Cited

U.S. PATENT DOCUMENTS

| | | | |
|---|---|---|---|
| 2,950,595 | 8/1960 | Laucher et al. | 239/265.31 |
| 3,434,666 | 3/1969 | Shaw | 239/265.31 |
| 3,616,648 | 11/1971 | Weise | 239/265.31 |

*Primary Examiner*—Galen L. Barefoot
*Attorney, Agent, or Firm*—Patrick J. Schlesinger; Frank D. Gilliam

[57] ABSTRACT

A thrust reverser for a fan jet engine enclosed by an engine nacelle. The nacelle has a forward section fixed to the aircraft structure and a rearward translatable section attached to the forward section. The nacelle forming a secondary fan nozzle. A pair of blocker doors are pivotally attached to the rearward translatable nacelle section. Drag links are pivotally attached to the forward nacelle section and one of the drag link connects to each blocker door. A cascade ring is fixedly attached to the rear nacelle section and is translatable therewith for positioning within the opening between the nacelle portions when the rearward section is in a translated position. An air motor with drive connections to a plurality of ball-screw actuators provides the means for uniformly translating the rearward section. A recess in the inner surface of the rearward section is provided for the stowing of the links in a position out of the engine gas flow stream when the rearward section is in its stowed forward position.

3 Claims, 6 Drawing Figures

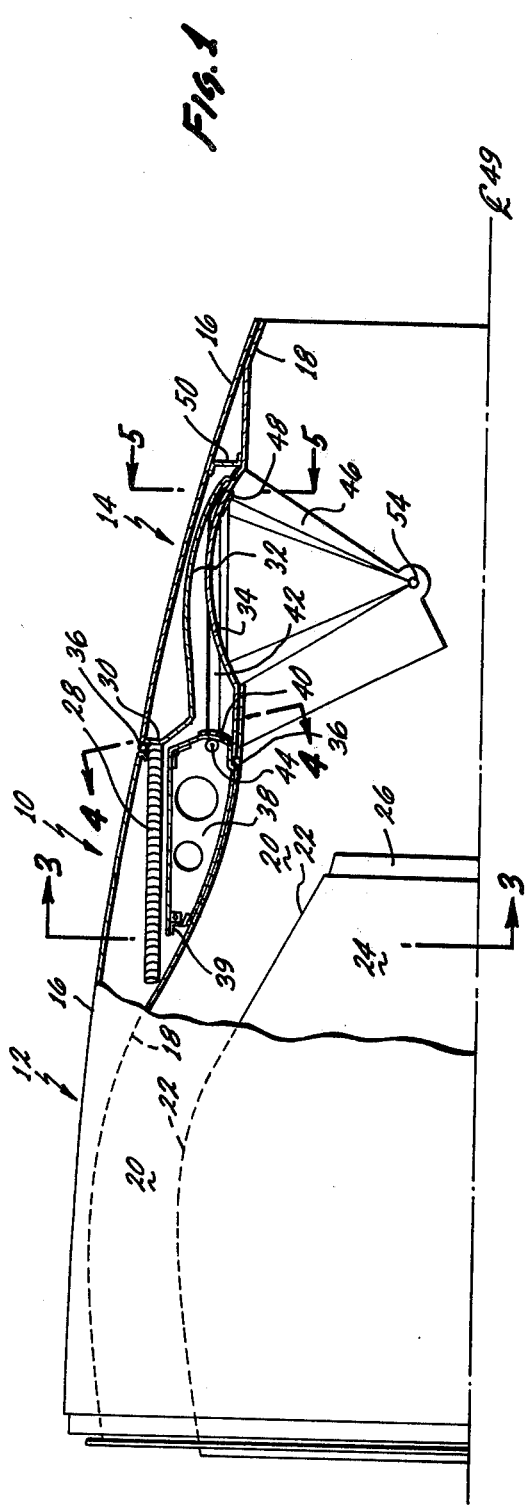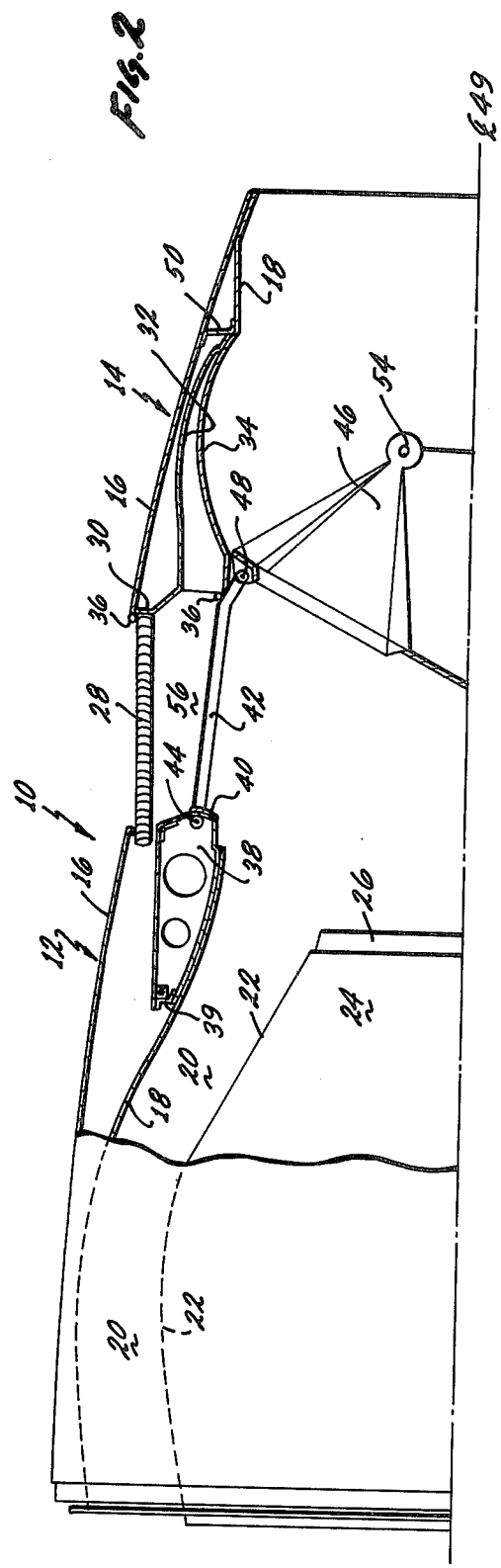

THRUST REVERSER-CASCADE TWO DOOR PRE-EXIT

BACKGROUND OF THE INVENTION

This invention relates generally to thrust reversers for bypass fan type jet propulsion engine nacelle systems that join the fan and primary jet flows into a common exit nozzle and more particularly to improvements therein.

Various thrust reversers of similar type have heretofore been provided in which a translatable fan cowl portion is translated rearward to expose a ring of reversing cascades which the combined bypass air and engine thrust gases flow through when the rearward nozzle exit is blocked by the blocker doors or flaps which are carried by the rearward section and have been rotated into position by the aft translation of rearward section. Generally, such prior art reversers have been suitable for the purpose intended; however, they have several structural and functional limitations imposed by the specific structure and combination of parts employed to accomplish the reverser function without compromising any of the aerodynamic characteristics, performance and function desired of the engine. Their principle restrictions have been cost, excess weight for small personal aircraft and complexity of operation with resultant high maintenance expense.

SUMMARY OF THE INVENTION

The present invention obtains the various benefits of the prior art devices with a reduction of economic cost, weight and complexity. Generally stated, the apparatus of the instant invention includes an elongated nacelle portion which surrounds the engine and provides an annular duct with the primary engine nozzle for directing the rearward flow of fan air, the duct terminating at a combined flow engine exit nozzle. The nacelle is divided near its aft end into a forward fixedly positioned section and an rearward translatable section. When the rearward section is stowed it defines a streamlined continuation of the forward section and when deployed rearward, defines a peripheral outflow passage communicating with both the primary nozzle and the fan duct.

A pair of blocker doors are pivotally attached to the rearward nacelle section and translate therewith. A ring of reverser cascades are attached to the forward surface of the rearward translatable nacelle section and also translate therewith and fill the peripheral outflow passage when the rearward nacelle section is deployed rearward and nest between the inner and outer forward nacelle walls when the rearward nacelle section is in its stowed position.

Each of a plurality of pivotally attached links connect the forward nacelle section and one of the reverser doors so as to rotate the doors forward and inward toward the engine center line as the rearward nacelle section translates rearward toward its deployed position and to rotate the door rearward and away from the engine center line as the rearward nacelle section translates forwardly to its stowed position.

The mechanism is simple to construct and service, light in weight due to a reduction of the number of elements utilized for its construction and operation, provides a positive and effective reversal of rearward thrust and when the mechanism in its stowed position is out of the rearward gas flow path.

The above and other specific features of the instant invention will be readily apparent as the description continues while being read in conjunction with the appended drawings.

BRIEF DESCRIPTION OF THE DRAWINGS

FIG. 1 is a side cutaway view of the upper half of the substantially symmetrical engine nacelle exposing the blocker doors, rearward translatable section and cascade ring in their stowed positions.

FIG. 2 is the same view as FIG. 1 with the various components in their deployed positions.

DETAILED DESCRIPTION OF THE PREFERRED EMBODIMENT

Figure 3:
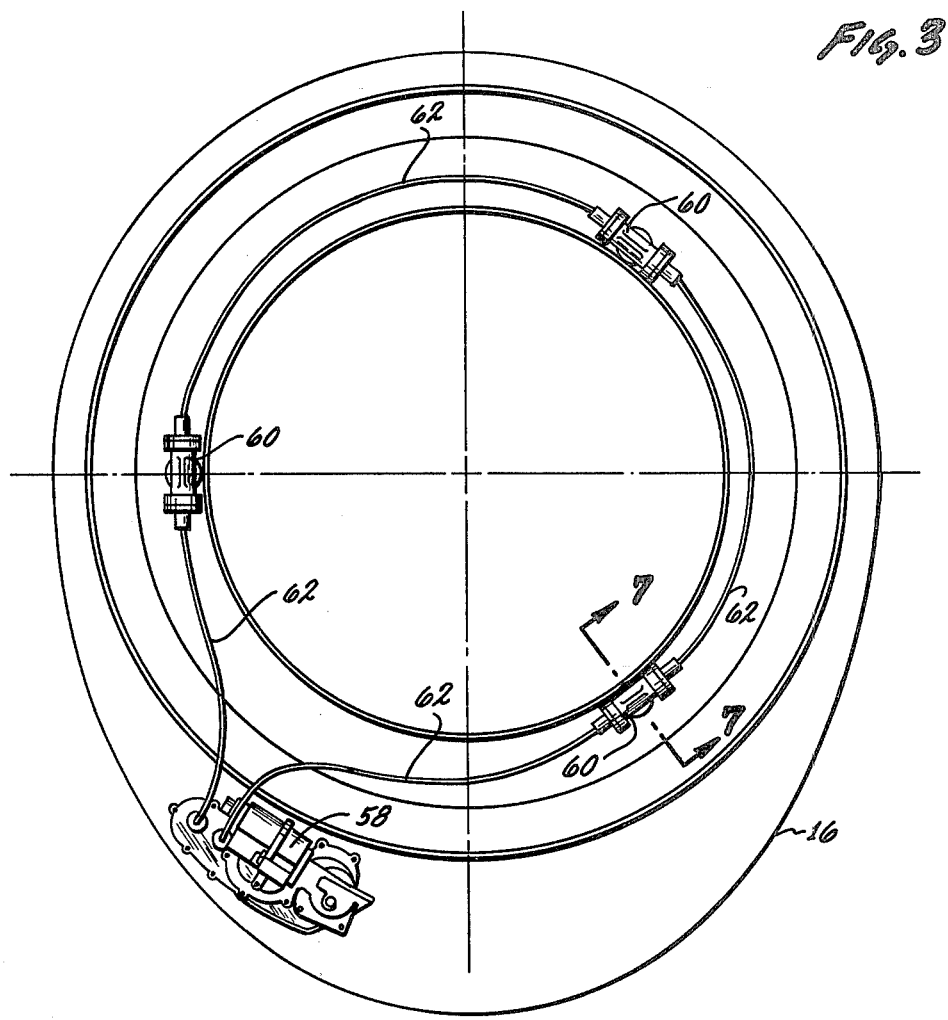
FIG. 3 is a view of the forward portion of the engine nacelle taken along lines 3—3 of FIG. 1 and including the lower half of the engine nacelle not shown in that Figure showing the translating mechanism.

Throughout the drawings and specifications, the same numerals are used to depict the identical elements or parts.

Referring now specifically to FIG. 1, this figure depicts the upper half of a substantially symmetrical rear engine nacelle 10 of the aircraft in which this invention is installed, the lower half not being shown. The nacelle 10 comprises a forward section 12 which is fixedly attached to the rear of the aircraft (not shown) and a translatable rear section 14. The engine nacelle 10 includes outer skin 16 and inner skin 18. The outer skin 16 forms the streamlined continuation of the engine nacelle. The forward portion of the inner skin 18 of engine nacelle 10 forms the outer surface of fan duct 20. The inner surface of the fan duct 20 is provided by the outer surface 22 of engine primary nozzle shroud 24, which surrounds the aircraft engine (not shown). The primary nozzle 26 of that aircraft engine is shown positioned rearward of the engine primary nozzle shroud 24. FIG. 1 is a showing of the apparatus of the thrust reverser in its fully stowed position.

Positioned within or between the outer skin 16 and the inner skin 18 of the engine nacelle 10 is a translating cascade member 28 which surrounds the inner surface of the cowling. This cascade member 28 is fixedly attached to a bulkhead 30 of the rear translating cowl section 14. A link well 32 is provided for storage of the links out of the engine gas flow stream. The link well is attached to the inner pan skin 34, thereby sealing and containing the fan and primary jet gases as they pass rearward to the common exhaust nozzle 26. The inner skin 34 precludes the necessity of sealing around the blocker doors as normally required in similar devices. An inner and outer circumferential seal 36 is provided to seal the inner and outer wetted surfaces for normal thrust operation. Positioned in the aft end of the fixed forward section 12 is a link gusset 38 which is fixedly attached to the inner skin 18 of the fixed section 12 of the engine cowl 10. Any convenient attachment means may be utilized such as that means shown in the figure, the fastener means 39 attaches the forward portion of the link gusset 38 while the rearward portion of that gusset is attached by a similar attachment at bulkhead 40, circumferentially around the inner skin 18. The door link 42 extending rearward from the link gusset 38 is pivotally attached at fixed pivot point 44. The rearward end of the door link 42 is pivotally attached to the upper rear surface of blocker door 46 at link translating pivot point 48. Conventional structural integrity members are mounted within the wall to support and keep the walls properly spaced. One example would be frame member 50 in the rear portion of the rear cowl section 14 between outer skin 16 and inner skin 18. The blocker doors 46 rotate about a pair of opposing pivot points 54 (foreground pivot point 54 shown) which are attached to the inner skin 18 substantially out of the normal rearward flow of engine and fan duct gases.

Referring now specifically to FIG. 2. This is the same showing as FIG. 1 except that the rear cowl section 14 has been translated to its maximum deployed or rearward position. As can be readily seen in this figure, the cascade 28 is now translated to a rearward position into opening 56 between the fixed forward cowl section 12 and the now translated rear cowl section 14. Due to the rearward translation of cowl section 14, door link 42 has been caused to move inward toward the engine center line 49 at its rear link translating pivot point. The translating of cowl section causes blocker door 46 to rotate towards the forward engine cowl section 12, closing off the rearward gas passageway.

Referring now specifically to FIG. 3. This figure is taken along line 3—3 of FIG. 1. The system shown is a pneumatic air motor-ball screw actuator. The number of actuators are dependent on design requirements, three are shown. The actuators 60 are driven by interconnecting drive cables 62 which extend from thrust reverser actuation air motor 58 so that each actuator will simultaneously translate the rear cowl section 14 an equal distance. Although an air motor 58 is shown for the purpose of rear cowl translation, it should be obvious that any convenient means may be utilized to cause the rear cowl section 14 to translate fore and aft uniformly about its circumference.

Figure 4:
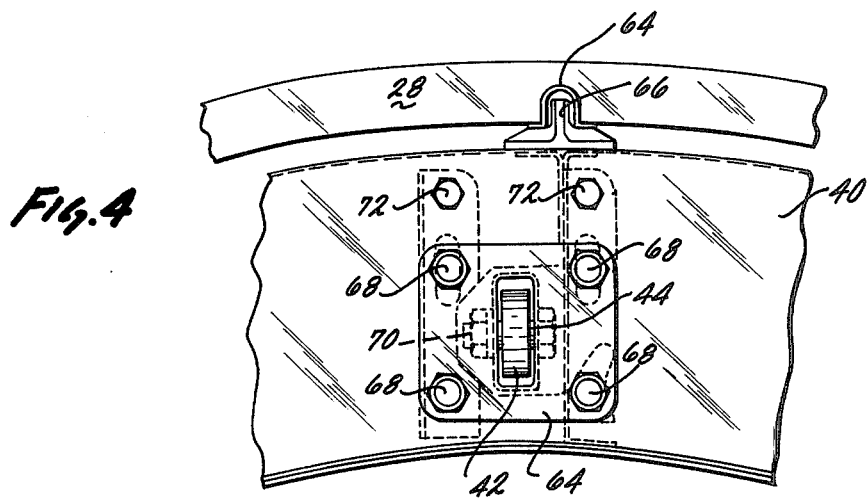
FIG. 4 is a showing taken along line 4—4 of FIG. 1.
Figure 5:
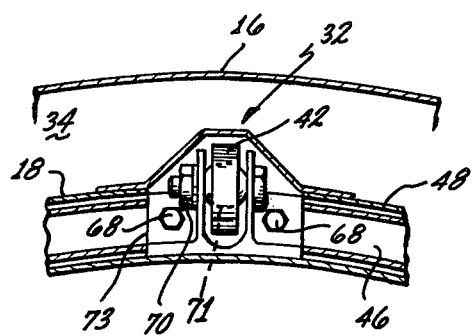
FIG. 5 is a showing taken along line 6—6 of FIG. 1.

Referring now specifically to FIG. 4, this view is taken along line 4—4 of FIG. 1. The translating cascades 28 and integrated cascade track 64, are attached to the rear translating cowl section 14 and the fixed track 66 which the cascade track 64 rides along are shown. Track 66 is fixedly atached to the forward section 12 of engine nacelle 10, adjacent to the link gusset 38. The link bracket 64 is attached to link gusset 38 and bulkhead 40 by any convenient fastening means 68. In the preferred embodiment, the fastening means 68 includes a lock nut and bolt combination typical in aircraft construction. The door link 42 is shown with the fixed pivot points 44 and 48 (see FIG. 6) are provided by a nut and bolt combination 70. A bearing 71 (see FIG. 6) is provided between the link 42 and the door link fitting 73 to accommodate misalignment due to manufacturing tolerance and differential thermal growth and to provide a low friction pivot at fixed pivot points 44 and 48. Gusset fastening means 72, typically lock nut and bolt combinations as hereinbefore discussed, are shown.

Figure 6:
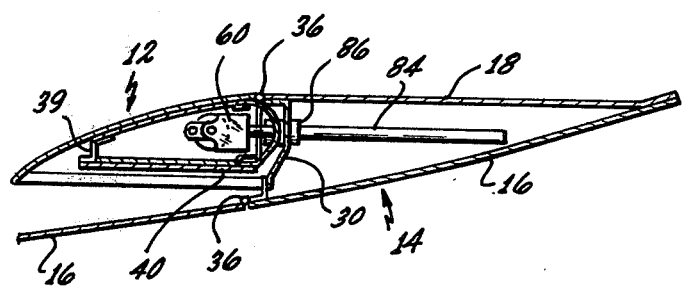
FIG. 6 is a showing taken along line 7—7 of FIG. 3 rotated 90°.

Referring now specifically to FIG. 6, this figure is taken along line 6—6 of FIG. 1. This figure, like the hereinbefore described FIG. 4, represent various showings of the drag link and its associated assembly.

Referring now specifically to FIG. 7, which is taken along the line 7—7 of FIG. 3 and rotated 90°. A ball screw actuator 60 and its associated screw 84 are shown. The actuation of the ball screw actuator by the reverser air motor 58 (see FIG. 3) causes the ball screw to rotate within ball nut 86, which is fixedly attached to the translating rear cowl section 14. Depending on the direction of the rotation of the screw, the nut is driven along the screw rearward or forward to position the translating rear cowl section 14 between its deployed and stowed positions. It should be clearly understood that any type of an actuator may be used in the place of the ball screw actuator 60, which will perform the functions required for translation of the translating rear cowl section 14. The ball screw actuator driven by thrust reverser air motor 60 is typical, but not limiting of the invention.

It will be apparent to those skilled in the art that many modifications and variations may be affected without departing from the spirit and scope of novel concepts of the present invention.

I claim as my invention:

1. A pre-exit thrust reverser for reversing the rearward flow of exhaust gases from a thrust producing jet aircraft engine, said engine being enclosed by a streamlined nacelle, said nacelle having a forward fixed section and a rearward translatable section, comprising:
   at least a pair of blocker doors pivotally attached to said rearward translatable section about an axis adjacent the longitudinal centerline of said section;
   a drag link member for each of said blocker doors, each of the drag link members pivotally attached at one end to said forward fixed portion and pivotally attached at their other end to the rearmost upper surface of their respective blocker door;
   a cascade member fixedly attached to said rearward translatable section and translatable therewith; and
   means for translating said rearward translatable section;
   said blocker doors rotating in a forward direction wherein the leading edge of said blocker doors first enter into said exhaust gases when said rearward translatable section is translated in an aft direction and rotating in a reverse direction out of the path of said exhaust gases when said rearward translatable section is translated in a forward direction.

2. The invention as defined in claim 1, wherein there is additionally provided a recess within the inner surface of said aft translatable section for receiving said drag links and said blocker doors when in a stowed position out of the path of said exhaust gases.

3. The invention as defined in claim 1, wherein circumferential seals are provided at the leading edge of said translatable section and translatable therewith for sealing said translatable section to said forward fixed section when said translatable section is in a stowed position.

* * * * *